(12) United States Patent
Wood

(10) Patent No.: US 6,715,708 B2
(45) Date of Patent: Apr. 6, 2004

(54) AUTOMATIC AND CONTINUOUS CALIBRATION OF FEED CORD PROPERTIES

(75) Inventor: Douglas Bruce Wood, Lincoln, NE (US)

(73) Assignee: The Goodyear Tire & Rubber Company, Akron, OH (US)

(*) Notice: Subject to any disclaimer, the term of this patent is extended or adjusted under 35 U.S.C. 154(b) by 1 day.

(21) Appl. No.: 10/147,727

(22) Filed: May 17, 2002

(65) Prior Publication Data
US 2003/0213863 A1 Nov. 20, 2003

(51) Int. Cl.[7] ............................................... B21C 47/14
(52) U.S. Cl. .................... 242/485.5; 242/418; 242/419; 242/443; 242/529
(58) Field of Search ................................. 242/443, 418, 242/419, 529, 485.5, 413.1; 73/160, 789; 226/43

(56) References Cited

U.S. PATENT DOCUMENTS

| | | | |
|---|---|---|---|
| 1,934,541 A | * | 11/1933 | Hildebrandt et al. ..... 242/485.5 |
| 3,674,221 A | * | 7/1972 | Riemersma .................. 73/789 |
| 3,988,879 A | * | 11/1976 | Franzolini et al. ....... 242/485.5 |
| 4,522,614 A | | 6/1985 | Matsuoka et al. |
| 4,566,319 A | * | 1/1986 | Yamazaki et al. ............ 73/160 |
| 5,733,399 A | | 3/1998 | Wood |
| 6,159,121 A | | 12/2000 | Di Giacomo et al. |
| 6,183,582 B1 | | 2/2001 | Gregg |
| 6,390,406 B1 | | 5/2002 | Wood |

FOREIGN PATENT DOCUMENTS

WO    WO 9722461    6/1997

* cited by examiner

Primary Examiner—Michael R. Mansen
(74) Attorney, Agent, or Firm—Nancy T. Krawczyk

(57) ABSTRACT

The invention is an apparatus and method for accurately applying a cord to a rotatable mandrel while manufacturing cord reinforced articles. The apparatus includes a rotating build mandrel, a cord supply, and a feed capstan for assisting in feeding cord from the cord supply to the mandrel along a defined cord path. At least two drums of differing diameters are located in the cord path. Encoders are connected to each drum for measuring at least the angular movement of the drum. Using the angular movement of the drums, the effective pitch line differential of the cord is determined.

11 Claims, 4 Drawing Sheets

AUTOMATIC AND CONTINUOUS CALIBRATION OF FEED CORD PROPERTIES

FIELD OF THE INVENTION

The present invention is directed to a method and apparatus for improving the accuracy of positive feed cording in manufacturing cord reinforced articles. Specifically, the disclosed method and apparatus provide instantaneous measurement of cord properties when feeding the cord to a rotating drum during the manufacture of articles such as belts, hoses, tires, reinforced airsleeves, and other similar articles formed in a tubular fashion during manufacturing.

BACKGROUND OF THE INVENTION

Cord feeding occurs during the manufacture of many reinforced articles, such as power transmission products. One example of a positive feed cording system is described in WO 97/22461.

The positive feed cording system includes means of metering a controlled length of cord onto a rotating drum in a helical pattern. The system uses a powered drum with an encoder to meter the cord that passes over it. The ratio of drum rotation to cord length applied is determined by the accurately known drum diameter (or more precisely, the circumference) and by the radial distance from the drum surface to the neutral bending plane of the cord; the last distance being the effective pitch line differential (EPLD).

The EPLD is not easily measured by examination of the cord, even if it is placed on a capstan. The average EPLD can be determined empirically by measuring the pitch length of the finished manufactured product, but accuracy is limited by other factors contributing to belt pitch length. The EPLD depends in part on the tension used, so each cord must be empirically tested at each tension to be used. Lot to lot variations in cord modulus, diameter, or resistance to flattening affect the actual EPLD, so the metered length of cord per capstan revolution is more accurately determined by the instantaneous value of the EPLD.

The EPLD is typically determined by a separate test performed prior to building the article on a rotating drum. The test consists of winding cord from the metering drum onto a rigid drum. The circumference of the rigid drum is accurately known and different from that of the metering drum. During the test, the rotation of both drums is accurately measured and the EPLD calculated from their relative velocity or displacements. This value is used to calibrate the building machine when that cord is later applied to a product slab being corded. This test can be repeated with sample of a material from several lots to determine the average and standard deviation of the EPLD property. Likewise, a cord material can be run under different conditions (i.e. cording speed, tension, temperature, and relative humidity) to determine the sensitivity of the EPLD of that cord to operating conditions.

However, the test conditions can often differ from the actual operating conditions and thus the predetermined EPLD may not be accurate at the time of building. Additionally, the EPLD can vary from material lot to material lot, requiring a choice of either frequent pretesting of each material lot or using an average, and possibly, inaccurate, EPLD for each material lot.

Accurate cord length is of particular importance in making toothed timing belts since an error in cord length can result in improper meshing of teeth and premature tooth or belt failure.

SUMMARY OF THE INVENTION

The present invention is directed to a method and apparatus for improving the accuracy and ease of use for positive feed cording by employing a continuous and automatic evaluation of the EPLD of the cord. It provides a more accurate EPLD and is tolerant of variations in the cord properties.

The disclosed apparatus is directed toward an apparatus for accurately applying a cord to a rotatable mandrel to produce an intermediate article of manufacture. The apparatus includes a rotating build mandrel, a cord supply, and a feed capstan for assisting in feeding cord from the cord supply to the mandrel along a defined cord path. In addition to these elements, the apparatus includes at least two additional drums located in the cord path. The drums have different diameters. Encoders are connected to each drum for measuring at least the angular movement of the drum. Control means are used to determine the effective pitch line differential of the cord as the cord travels through the cord path from the measured angular movements of the drums.

In another aspect of the disclosed apparatus, one of the drums is power driven to drive the cord along its cord path.

In another aspect of the disclosed apparatus, one of the drums measures the cord tension as the cord travels over the drum.

In another aspect of the disclosed apparatus, two additional drums are located in the cord path. The drums have diameters different from each other, but may be identical to the first two drums in the system about which the cord already travels. Encoders are connected to each of the two additional drums. The encoder measures at least the angular movement of the drum.

In another aspect of the invention, the tension T1 in the cord path as the cord travels over the first two drums differs from the tension T2 in the cord path as the cord travels over the two additional drums.

In a further aspect of the invention, the controls means measures the cord modulus in accordance with the following equation:

$$\text{modulus} = \Delta T / (\Delta L / \text{original cord length})$$

where $\Delta T$=the absolute difference between T1 and T2 and $\Delta L$ is the absolute value of the change in the cord length measured between the first set of drums and the two additional drums.

Also disclosed is a method of applying a cord to a rotatable build mandrel. The method includes supplying a cord, feeding the cord along a defined cord path, and winding the cord onto a rotatable mandrel to build an intermediate article of manufacture. In accordance with the invention, prior to winding the cord onto the rotatable mandrel, the cord is passed over two drums of differing diameters. As the cord passes over the drum, the angular movement of the drum is measured. From the measurement of the angular movement, the EPLD of the cord is calculated. The equation to measure the EPLD is:

$$EPLD = \frac{(RL*AL) - (RS*AS)}{(AS - AL)}$$

where R is the radius of each drum, A is the angular displacement, L represents the larger drum, and s represents the smaller drum.

In one aspect of the method, the cord is wrapped about a drum that is motor driven.

In another aspect of the method, the tension of the cord is measured as the cord passes over one of the drums.

In accordance with another aspect of the invention, the cord passes over two additional drums. The drums have differing diameters from each other and may or may not be of identical diameters as the first two drums. Preferably, the tension at which the cords travel over the two additional drums is different than the tension at which the cord travels over the first two drums. The cord modulus is measured in accordance with the following equation:

$$\text{modulus} = \Delta T/(\Delta L/\text{original cord length})$$

where $\Delta T$=the absolute difference between T1 and T2 and $\Delta L$ is the absolute value of the change in the cord length measured between the first set of drums and the two additional drums.

BRIEF DESCRIPTION OF THE DRAWINGS

The invention will be described by way of example and with reference to the accompanying drawings in which.

DETAILED DESCRIPTION OF THE INVENTION

The present invention is directed to a method and apparatus for providing instantaneous measurement of cord properties when feeding the cord to a rotating drum during the manufacture of articles such as belts, hoses, tires, reinforced airsleeves, and other similar articles formed in a tubular fashion during manufacturing. By way of example only, and not limiting the present invention to singular type of article, the invention is specifically described in the context of an apparatus for forming elastomeric drive belts using a positive cord feeding system. Positive cord feeding is described in WO 97/22461, which is incorporated herein in its entirety.

In the known method of positive cord feeding, the length of the cord applied to the drum is measured by a capstan and an encoder attached to the capstan. The encoder measures only the angular position or velocity of the capstan. The cord length represented by each revolution of the capstan depends on the circumference of the capstan and on the effective pitch line differential (EPLD) of the cord on the capstan.

In accordance with the present invention, the EPLD is measured by winding cord from one drum of known diameter to another accurately machined, rigid drum located along the cording path. The drums have a circumference different from each other. The ratio of the angular displacement of the first drum to the angular displacement of the second drum is proportional to the ratio of the effective cord radius on the two drums. The difference between the effective radii and the accurately known radius of the capstan and drum is the EPLD, and can be expressed by the following equation:

$$EPLD = \frac{(RL*AL) - (RS*AS)}{(AS - AL)}$$

wherein R is the radius of each drum measured in mm and A is the angular displacement measured in radians. L is for the larger drum and s is for the smaller drum, relative to each other. The resulting EPLD is calculated in mm. Once the EPLD is determined, the value is used to calibrate the cord-winding machine to apply the correct tension to the cord as the cord is being applied to the rotating mandrel.

Methods and apparatus for positive cord feeding while accurately measuring the LPD are illustrated in the accompanying Figures.

Figure 1:
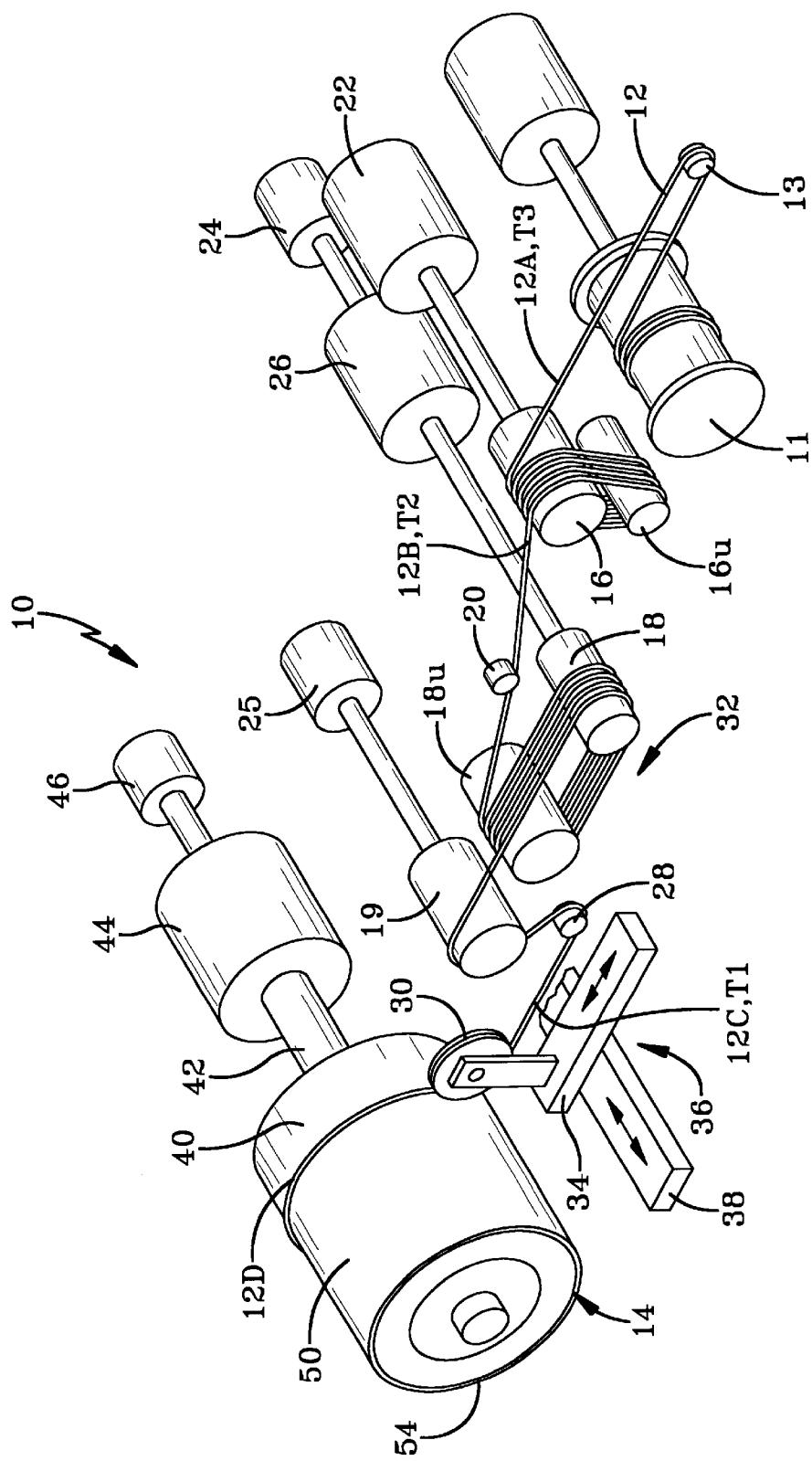
FIG. 1 illustrates a cord feeding and cord property measuring system in accordance with the invention.

FIG. 1 is a perspective view of an apparatus 10 for applying cords 12 to a rotating mandrel 14. The cord 12 passes through multiple tension zones before being wound upon the mandrel 14. In the first span 12C, closest to the mandrel 14, the cord 12 is under a tension T1. The first span 12C is the path of the cord 12 from a feed capstan 18 to the mandrel 14. In the second tension span 12B, extending from a tension capstan 16 to the feed capstan 18, the cord 12 is under a tension T2. In the third tension span 12A, extending from the cord supply 11 to the tension capstan 16, the cord 12 is under a tension T3.

Prior to tension span 12C, the cord 12 is fed from the cord supply 11 and travels about a dancer 13. The dancer 13 controls the tension T3 in the cord span 12A. The dancer 13 also controls the relative speed of the tension capstan 16 and cord supply source 11.

Tension capstan 16 is a demand feed, tension control device that changes the tension in the cord 12 from a tension T3 to tension T2. This change in cord tension occurs while the apparatus 10 is operating at a variable cord speed in the section 12B of the cord path. The variable cord speed is determined by the speed required for the cord 12 to enter feed capstan 18. The cord tension in the second path section 12B is measured by a tension sensor 20. The tension sensor 20 controls the speed of the feed capstan 16 relative to the feed capstan 18 to compensate for any change in the length of the second path section 12B and to maintain the tension T2 in the second path section 12B at a desired level.

The tension capstan 16 is preferably of a conventional design, meaning it depends on the coefficient of friction and the arc of contact between the tension capstan 16 and the cord 12. The tension capstan 16 depends on T3 and T2 both being greater than zero to create a difference between T3 and T2 which is relatively independent of variations in T3 and where T2 can be greater than or less than T3. The allowable tension T3 is determined by the characteristics of the cord 12 and the cord package design for the article being manufactured. The allowable tension T3 can vary from a few grams to several hundred pounds by scaling the size of several components described. The tension capstan 16 has a powered drum 16 driven by motor 22 and an accompanying unpowered drum 16u.

The control system for the motor 22 which turns the tension capstan 16 can use feedback from the tension sensor 20 and positional and rotational data from a feed capstan encoder 24 to accurately control tension T2.

The third cord path section 12C extends from the feed capstan 18 to the mandrel 14 onto which the cord 12 is to be wound. The feed capstan 18 is also preferably of conventional design, similar to the tension capstan 16 in that it depends on a coefficient of friction and arc of contact between the cord 12 and the feed capstan 18 and depends on T2 and T1 both being greater than zero to propel a cord 12 from the second portion of the path 12B to the third portion of the path 12C. The ratio T1/T2 ranges from 0.05 to 20 and is preferably always less than or greater than 1.0 during operation of the apparatus 10. The feed capstan 18 has a powered drum 18 driven by the motor 26 and an accompanying unpowered drum 18u.

The feed capstan 18 preferably has a cylindrical outer surface of an accurately known circumference on which the cord 12 rests when in contact with the feed capstan 18. The motor 26 can apply clockwise or counterclockwise torque to the feed capstan 18. The torque supplied is of sufficient magnitude to cause the feed capstan 18 to rotate and the cord 12 to move a desired feed distance along the path 12B, 12C relatively independent of tension T1 and T2.

The feed capstan 18 is electronically geared so that the length of cord 12, rather than its tension, can be controlled. In other words, the feed capstan 18 "positively feeds" the cord 12 in regards to its length, rather than "demand feeds" the cord 12 in regards to tension in the cord 12. The expandable diaphragm 54 on the mandrel 14 controls the tension in the cord 12.

The feed capstan 18 and the motor 26 are connected to an encoder 24 which accurately detects the position and rotation of the feed capstan 18, and thereby accurately measures the movement of the cord 12 from the second path section 12B into the third path section 12C, subject to the accuracy with which the EPLD is known.

Adjacent to the feed capstan 18 is a fixed diameter drum 19. The cord 12 is also wound about the drum 19. The drum 19 is connected to an encoder 25 that accurately detects the position and rotation of the drum 19. The drum 19 has a diameter different from that of the feed capstan 18. The drum diameter is illustrated as being greater than the capstan diameter; however, it may be less than the feed capstan diameter. The cord need only make a single pass about the drum 19. The tension and arc of contact as the cord 12 passes over the feed capstan 18 and the fixed drum 19 must be sufficient to prevent slippage of the cord 12 under the prevailing torque.

Also contained within cord path section 12C is a tension measuring device 28 for each cord 12 passing through section 12C, and at least one cord laying wheel 30. The cord laying wheel 30, tension measuring device 28, drum 19, and feed capstan 18 are mounted rigidly with respect to one another to form an assembly 32 to maintain a constant length in the third cord path 12C. The assembly 32 is mounted on a radial positioning system 34 to form a radial assembly 36 which can accurately bring the perimeter of the cord laying wheel 30 to a desired radial distance from the center of rotation of the mandrel 14. The radial positioning system 34 includes linear bearings that have only one degree of freedom in the direction perpendicular to the axis of rotation of the mandrel.

The radial assembly 36 is mounted on the axial position system 38 that can move the radial assembly 36 parallel to the axis of rotation of the mandrel 14. The axial positioning system 38 includes a linear bearing or slide that supports the radial positioning system 34. The linear bearings of the axial positioning system 38 have only one degree of freedom in the direction parallel to the axis of rotation of the mandrel 14. The radial positioning system 34 and the axial positioning system 38 are strong, stiff, and rigid enough to prevent linear motion in any undesired direction or rotation of the rigid assembly 32 about any axis.

The combined motion of the radial and axial support systems 34, 38 defines a plane containing the axis of rotation of the mandrel 14 and the centerline of the cord laying wheel 30. This configuration allows for easy control of the radius at which the cord is laid on the mandrel 14.

The mandrel 14 is rigidly coupled to and rotates with a mandrel support shaft 42 connected to a drive motor 44; the drive motor 44 rotates the shaft 42 and mandrel 14.

The shaft 42 is also connected to a position-determining means accurately determining the position of the mandrel 14. In the preferred embodiment, the position-determining means is an encoder 46 that accurately measures the position and rotation of the shaft 42 and mandrel 14.

The shaft 42, radial positioning system 34, and axial position system 38 are connected for coordinated motion allowing the shaft 42 and axial positioning system 38 to move concurrently in a way that causes the cord laying wheel 30 to move in a helical or any other specified path along the outer cylindrical surface of the mandrel 14.

The rotation of the mandrel 14 is measured by encoder 46. The rotation of the feed capstan 18 is measured by an encoder 24. A control system (not shown) controls the rotation speed and angular acceleration of either the mandrel 14 or the feed capstan 18, and contains an algorithm defining the desired relative motion of the mandrel 14 and the feed capstan 18. For example, in the case of a cord 12 wound at constant helical pitch on a cylindrical mandrel 14, the relative motion is a constant gear ratio matching the speed of the cord 12 on the feed capstan 18 to the theoretical surface speed required to create a path 12D at the proper tension T1 on the mandrel 14.

The mandrel 14 has an outer surface 40 onto which the cord 12 is wound along cord path 12D. Layers of other materials 50 may be placed on the mandrel 14 before winding of the cord 12. The layers 50 may include discrete components, sheet material, or previously applied wound cord. The circumference of the mandrel 14 and these underlying layers 50 must be at least large enough to maintain the minimum required tension T1 in cord path section 12C, and must be no larger than the circumference required to maintain the maximum allowed tension in path 12C.

The above-described mandrel 14, by means of the diaphragm 54, can expand to provide for a very small adjustment in the tension T1 of the cord applied to the mandrel 14. Mandrels 14 with different radii can be attached to the mandrel support shaft 42 to make cord reinforced articles with a wide range of circumference at the cord neutral plane.

As discussed above, the EPLD is determined by the position and rotation of the capstan 18, as measured by its associated encoder 24, and the position and rotation of the drum 19, as measured by its associated encoder 25. The position and rotation of the capstan 18 and drum 19, as measured by the encoders 24, 25, is sent to a control means capable of performing the mathematical determination of the EPLD. The control means is preferably the electronic means that controls the entire cord feeding system. The ratio of the angular displacement of the capstan 18 to the angular displacement of the drum 19 is proportional to the ratio of the effective cord radius on the drum and on the capstan. For the illustrated example, where drum 19 is larger than drum 18, the previous equation is:

$$EPLD = \frac{(R_{19} * A_{19}) - (R_{18} * A_{18})}{(A_{18} - A_{19})}$$

Figure 2:
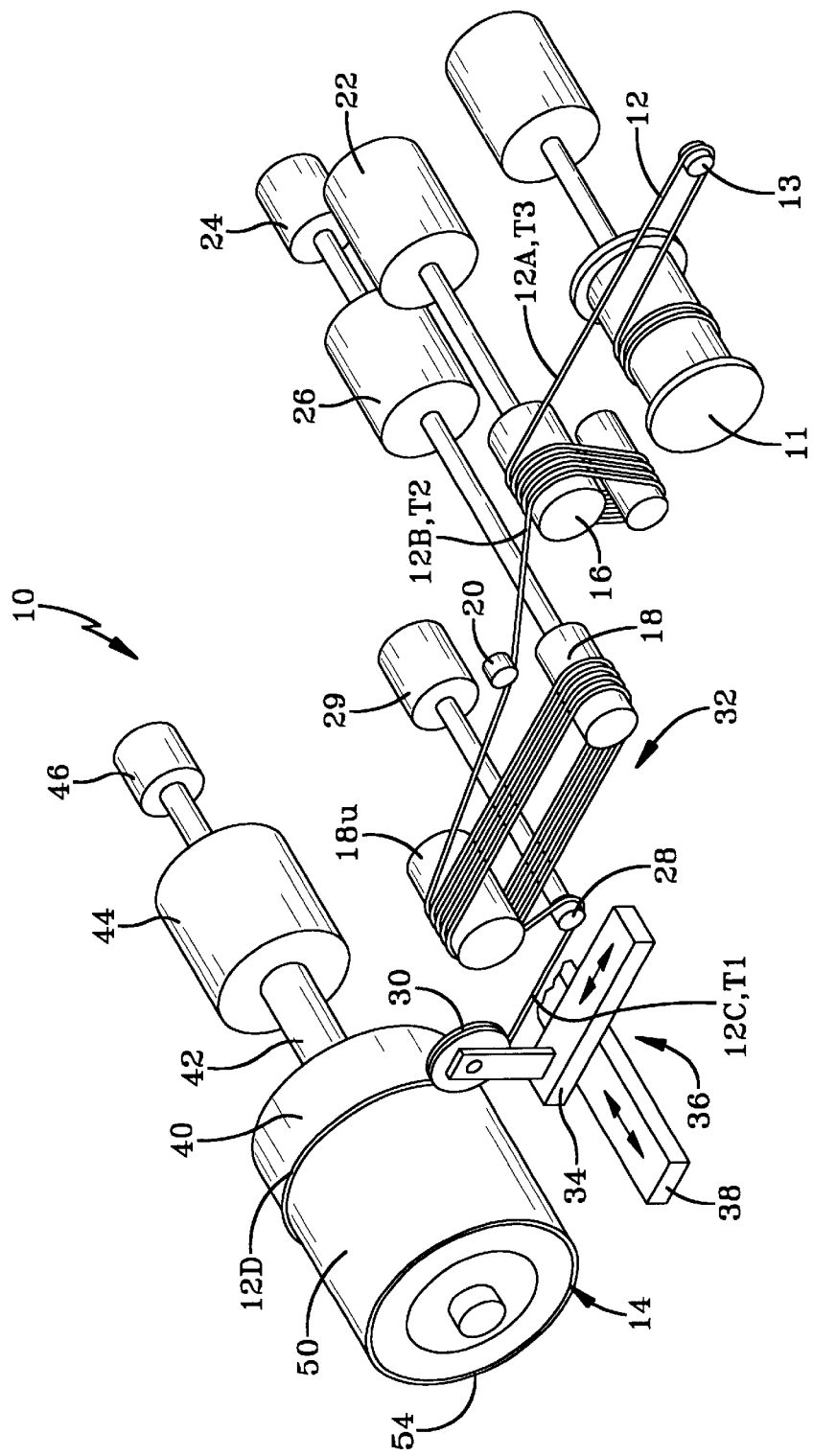
FIGS. 2, 3 and 4 are further embodiments of the inventive system.

Alternatively, as seen in FIG. 2, the cord tension sensor 28 is provided with an encoder 29 and the sensor information measured by the encoder, i.e. radius and angular displacement, is used in conjunction with the same data from the feed capstan 18 to determine the EPLD. Similar to above, the capstan 18 and the sensor 28 are drum L and drum S for the EPLD equation, depending upon which has the larger diameter.

Figure 3:
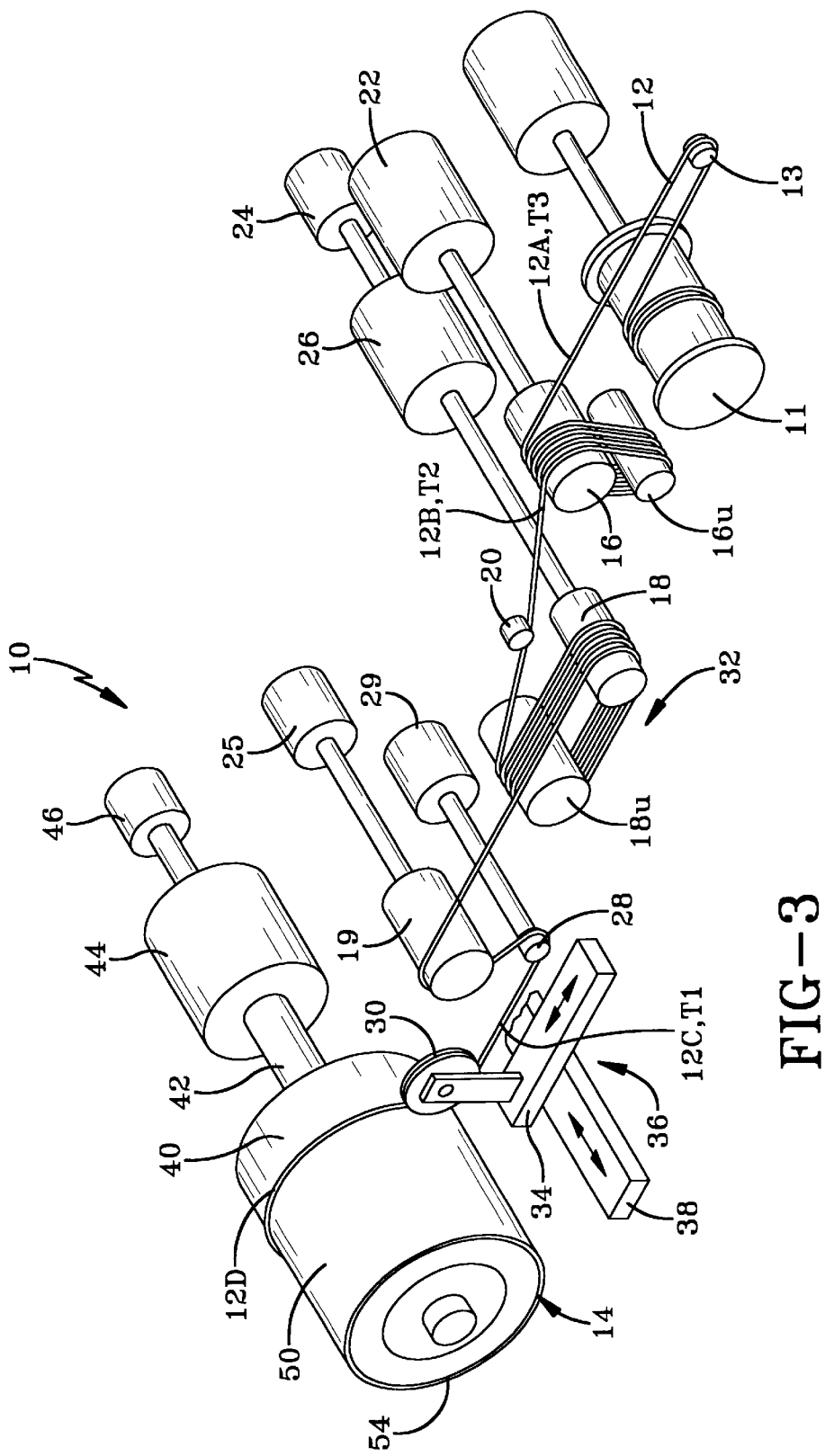

Another embodiment is seen in FIG. 3. A passive drum 19, with an associate encoder 25 is placed in the cord path 12C, between the capstan 18 and the sensor 28. The sensor 28 has an encoder 29. Again, it is required that the diameter of drum 19 and sensor 28 be different. The drum 19 and the sensor 28 are drum L and drum S for the EPLD equation, depending upon which has the larger diameter.

In this embodiment, the drum 19 and the sensor 28 require very little torque to drive them, so the angular displacement can be measured more accurately, and the tension in the cord is nearly equal at the drum 19 and the sensor 28.

Figure 4:
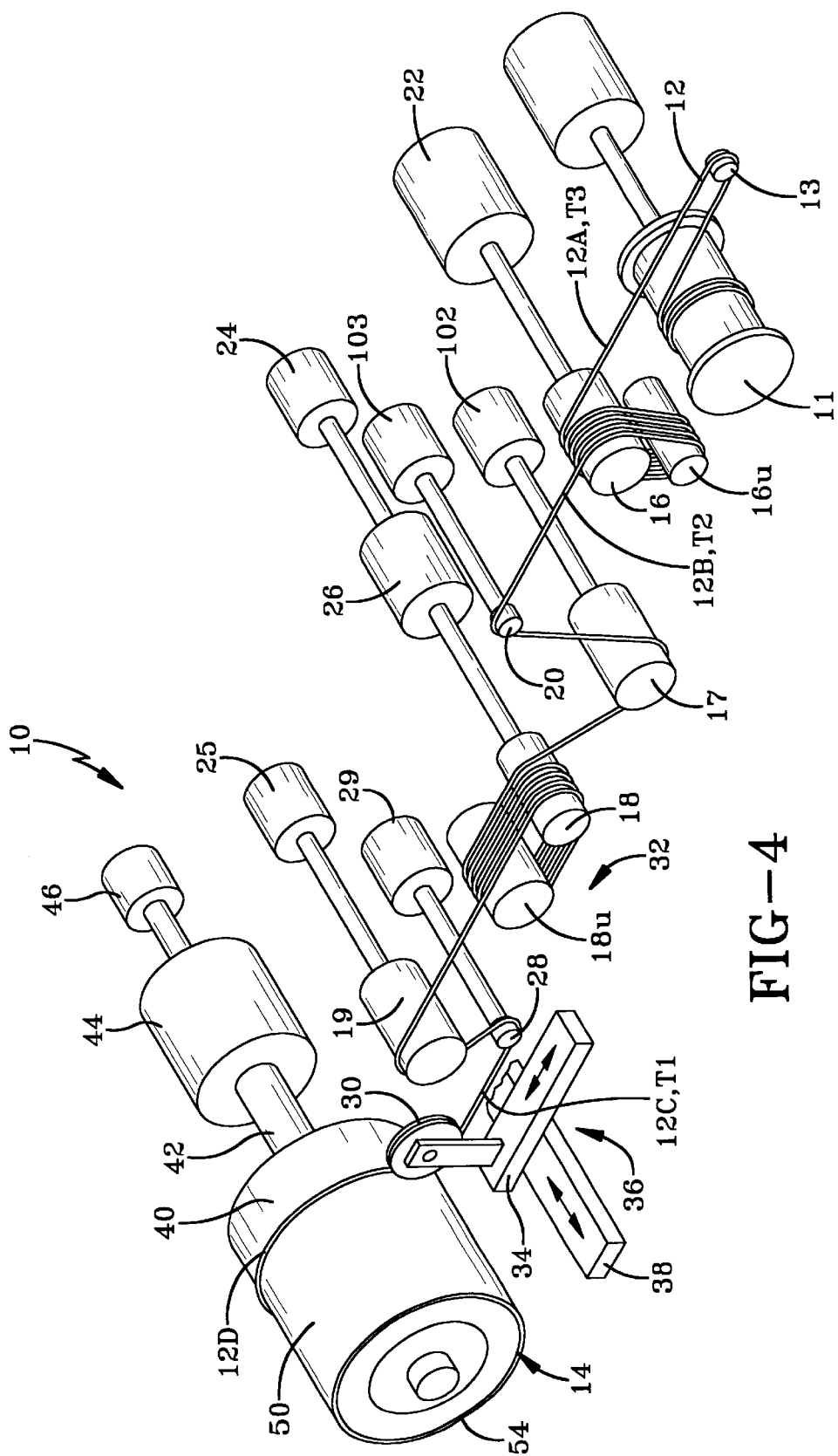

FIG. 4 illustrates a further embodiment and variation on the disclosed measuring system and method of that shown in FIG. 3. There is a passive drum 19, with an associated encoder 25 in the cord path 12C, between the capstan 18 and the sensor 28 and its associated encoder 29. Additionally, a second passive drum 17 and an associated encoder 102 are placed in the cord path 12B. The tension sensor 20 is also provided with an encoder 103. The diameters of drum 17 and sensor 20 are different from each other but may or may not be equal to the diameters of drum 19 and sensor 28.

By having a pair of known diameter drums with encoders in a different tension zone of the apparatus 10, the modulus of the cord 12 may be determined, in addition to the EPLD. The modulus is the ratio of incremental tension to incremental length where incremental tension is the difference in tension measured by the two sensors 20, 28. The incremental length is the difference of length traveled at effective pitch radius at the drums 17, 19 divided by the length traveled at drum 17. The relevant equation is:

$$MOD = \Delta T/(\Delta L/\text{original length})$$

Where T is tension and L is length. As it applies to the mechanical arrangement of FIG. 4:

$$MOD = \frac{(T1 - T2) * (A_{17} * (R_{17} + EPLD_{17}))}{(A_{19} * (R_{19} + EPLD_{19})) - (A_{17} * (R_{17} + EPLD_{17}))}$$

Where T1, T2 are preferably measured in newtons, $A_{17}$ and $A_{19}$ are measured in radians, and $R_{17}$, $R_{19}$, Rig, $EPLD_{17}$, and $EPLD_{19}$ are in mm. The modulus is reported in the same measurement unit as the tension. As evident by the equation, the EPLD is measured at both locations; $EPLD_{17}$ being calculated using drum 17 and sensor 20 and $EPLD_{19}$ being calculated using drum 19 and sensor 28. Again, as with determining the EPLD, the actual calculation of the modulus is determined by control means attached to the encoders and which, preferably, operates the entire system.

It is to be understood that the values in all of the equations may be made employing any conventional system of measurements, and the invention is not limited to the specific use of newtons or mm as discussed above.

While the steps of measuring the EPLD are specifically illustrated with a particular positive feed cording system, it would be appreciated by those skilled in the art that the method and apparatus disclosed herein may be used with any type of feed cording system to provide instantaneous measurement of the cord properties. Providing instantaneous measurement reduces labor and down time of equipment, and results in a more accurately manufactured product which results in a better performing, longer life product.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An apparatus for accurately applying a cord to a rotatable mandrel, the apparatus comprising a rotating build mandrel, a cord supply, a feed capstan for assisting in feeding cord from the cord supply to the mandrel along a defined cord path, the apparatus characterized by:
    two drums located in the cord path, the drums being of different diameters,
    an encoder connected to each drum, the encoder measuring at least the angular movement of the drum, and
    control means to measure the effective pitch line differential of the cord as the cord travels through the cord path.

2. An apparatus in accordance with claim 1 wherein one of the drums is power driven to drive the cord along its cord path.

3. An apparatus in accordance with claim 1 wherein the two drums are non-powered.

4. An apparatus in accordance with claim 1 wherein at least one of the drums is also used to measure the cord tension.

5. An apparatus in accordance with claim 1 wherein the apparatus is further comprised of two additional drums located in the cord path, the drums being of different diameters, and an encoder connected to each drum, the encoders measuring at least the angular movement of the drum.

6. An apparatus in accordance with claim 5 wherein the tension T1 in the cord path as the cord travels over the first two drums differs from the tension T2 in the cord path as the cord travels over the two additional drums.

7. An apparatus in accordance with claim 6 wherein the control means measures the cord modulus in accordance with the following equation:

$$\text{modulus} = \Delta T/(\Delta L/\text{original cord length})$$

where $\Delta T$=the absolute difference between T1 and T2 and $\Delta L$ is the absolute value of the change in the cord length measured between the first set of drums and the two additional drums.

8. A method of applying a cord to a rotatable mandrel, the method comprising supplying a cord, feeding the cord along a defined cord path, and winding the cord onto a rotatable build mandrel, the method characterized by:
    prior to winding the cord onto the rotatable mandrel, passing the cord over two drums of differing diameters,
    measuring the angular movement of the drums as the cord passes over the drums, and
    calculating the effective pitch line differential of the cord by the following equation:

$$EPLD = \frac{(RL * AL) - (RS * AS)}{(AS - AL)}$$

where R is the radius of each drum, A is the angular displacement, L represents the larger drum, and S represents the smaller drum.

9. A method in accordance with claim 8 further comprising the step of wrapping the cord about one of the drums and the drum so wrapped is motor driven.

10. A method in accordance with claim 8 further comprising measuring the tension of the cord as it passes over one of the drums.

11. A method in accordance with claim 8 further comprising the steps of passing the cord over two additional drums of differing diameters at a tension different from the tension at which the cord is passed over the first two drums, and measuring the cord modulus in accordance with the following equation:

$$modulus = \Delta T/(\Delta L/\text{original cord length})$$

where $\Delta T$=the absolute difference between T1 and T2 and $\Delta L$ is the absolute value of the change in the cord length measured between the first set of drums and the two additional drums.

* * * * *